(12) United States Patent
Earle

(10) Patent No.: US 7,909,347 B2
(45) Date of Patent: Mar. 22, 2011

(54) BICYCLE SUSPENSION SYSTEM EMPLOYING HIGHLY PREDICTABLE PEDALLING CHARACTERISTICS

(75) Inventor: David Earle, Watsonville, CA (US)

(73) Assignee: A-Pro Tech Co., Ltd, Taichung Hsien (TW)

( * ) Notice: Subject to any disclaimer, the term of this patent is extended or adjusted under 35 U.S.C. 154(b) by 141 days.

(21) Appl. No.: 12/232,122

(22) Filed: Sep. 11, 2008

(65) Prior Publication Data

US 2010/0059965 A1 Mar. 11, 2010

(51) Int. Cl.
*B62K 19/00* (2006.01)
*B62K 25/00* (2006.01)

(52) U.S. Cl. .................... 280/284; 280/275; 280/283

(58) Field of Classification Search .................. 180/227; 280/275, 283, 284, 285

See application file for complete search history.

(56) References Cited

U.S. PATENT DOCUMENTS

| 6,688,626 | B2* | 2/2004 | Felsl et al. | 280/275 |
| 7,100,930 | B2* | 9/2006 | Saiki | 280/284 |
| 7,240,912 | B2* | 7/2007 | Whyte | 280/284 |
| 7,350,797 | B2* | 4/2008 | Carroll | 280/284 |
| 7,703,788 | B2* | 4/2010 | Tanouye et al. | 280/284 |
| 2008/0023935 | A1* | 1/2008 | McAndrews | 280/283 |
| 2008/0258427 | A1* | 10/2008 | Buckley | 280/284 |
| 2009/0250897 | A1* | 10/2009 | Tanouye et al. | 280/284 |
| 2009/0261557 | A1* | 10/2009 | Beale et al. | 280/284 |
| 2010/0007113 | A1* | 1/2010 | Earle et al. | 280/284 |

* cited by examiner

*Primary Examiner* — Joanne Silbermann
*Assistant Examiner* — Marc A Scharich
(74) *Attorney, Agent, or Firm* — Kolisch Hartwell, P.C.

(57) ABSTRACT

A bicycle rear suspension system that includes a main frame and a rear wheel suspension system, the main frame generally is comprised of a seat tube, a down tube, a top tube, and a head tube. The rear wheel suspension system consists of a first linkage member, a rear wheel swingarm, and a second linkage member. The rear wheel suspension system allows for a preferential linear decrease in rate of chainstay lengthening combined with a preferential linear decrease in rate of acceleration anti-squat with the value of 100% anti-squat occurring at the statically weighted sag point.

12 Claims, 8 Drawing Sheets

BICYCLE SUSPENSION SYSTEM EMPLOYING HIGHLY PREDICTABLE PEDALLING CHARACTERISTICS

FIELD OF THE INVENTION

The present invention relates to a bicycle rear suspension system which offers improved pedaling and bump absorption performance by means of combined controlled linear chain stay lengthening and anti-squat characteristics through the use of a linkage system.

BACKGROUND OF THE INVENTION

There are numerous bicycle suspension systems in use today to improve performance. Many of these systems tune two important parameters that relate to unwanted suspension motion when the system is responding to pedal inputs. Other systems attempt to optimize the braking response of the suspension system. The present invention tunes both of the pedal performance parameters together to behave in a linear relationship so that their combined effect is highly predictable to the rider. Additionally, a third parameter that is related to improved braking performance is also tuned in the present invention. This parameter is the braking anti-squat percentage. This parameter is also tuned to behave in a linear relationship so that the overall performance of the bicycle is highly predictable under both pedaling and braking.

The first parameter is the rate of change of the distance from the bottom bracket pedal axis to the rear wheel axle, commonly known as dCSL. It is known that it is desirable to have a certain dCSL value at the point in the suspension's compression known as the sag point where the system is in static equilibrium under the rider's weight. However, it is undesirable to have high values for the dCSL at points farther in the suspension's compression as this creates a pull on the pedals when a larger bump is encountered as when riding over very rough terrain. The known systems that employ a reduction in dCSL as the system is further compressed generally display a curved relationship between dCSL and the vertical wheel travel resulting in unpredictable response to the rider when encountering bumps of various sizes. The present invention employs a reduction in dCSL with respect to increasing vertical wheel travel while displaying a linear relationship. This results in highly predictable response. The second parameter is the acceleration anti-squat effect created by the kinematics of the suspension system. This effect is tuned so that a weight transfer rearward as a result of forward acceleration does not result in varying amounts of suspension compression throughout the compression of the system. A value of 100% anti-squat results in no suspension compression as a result of weight transfer. The known systems that employ anti-squat to tune the compression of the suspension generally display a curved relationship of percent anti-squat vs. vertical wheel travel. The present invention employs a reduction in percentage anti-squat with respect to increasing vertical wheel travel while displaying a linear relationship. Additionally, the point where 100% anti-squat is achieved is at the linear sag point. This results in an optimally tuned system that is very predictable throughout the range of suspension motion.

SUMMARY OF THE INVENTION

The suspension system is made up of a bicycle main frame and rear wheel triangle. The main frame typically but not in all cases consists of: a head tube for the steering apparatus, seat tube, down tube, top tube, and a bottom bracket for the pedal/drive apparatus, a connection to the front end of a spring/damper shock absorber, a connection to a first link, and a connection to a second link. The rear wheel triangle consists of: a pair of seat stays, one end connecting to dropout and other to seat stay ends; a pair of chain stays, one end connecting to a dropout and the other to a chain stay yoke, a pair of dropouts to hold the rear wheel, a chain stay yoke that allows for the connection to the first link, and seat stay ends that allow for the connection to the second link and the shock absorber.

The main frame and rear wheel triangle of the bicycle allow for the attachment of conventional bicycle components such as handlebars, a seat, the drivetrain and brakes in a standard configuration. The rear wheel triangle also has attachment points to linkage members in specific locations that contribute to controlling the motion of the rear wheel axle.

The first and the second link contribute to controlling the motion of the rear wheel axle and thus the rate of chainstay lengthening. Both links rotate clockwise when viewed from the drivetrain side of the bike. In addition to contributing to controlling the rear axle motion, the second link, in some but not all configurations, also allows for the attachment of the shock absorber, and its configuration controls the ratio of the shock absorber compression relative to the rear wheel compression.

The configuration of the linkage of the rear wheel suspension system controls the motion of the intersection of the force lines running from pivot to pivot along the first and second linkage members. This intersection is commonly referred to as the instant center of the linkage. As the system is compressed, the instant center moves in a generally rearward and downward trajectory, but always in front of the most forward pivot of the first linkage member. This motion of the linkage instant center is responsible for the improved anti-squat characteristics.

DETAILED DESCRIPTION OF THE PREFERRED EMBODIMENT

Figure 1:
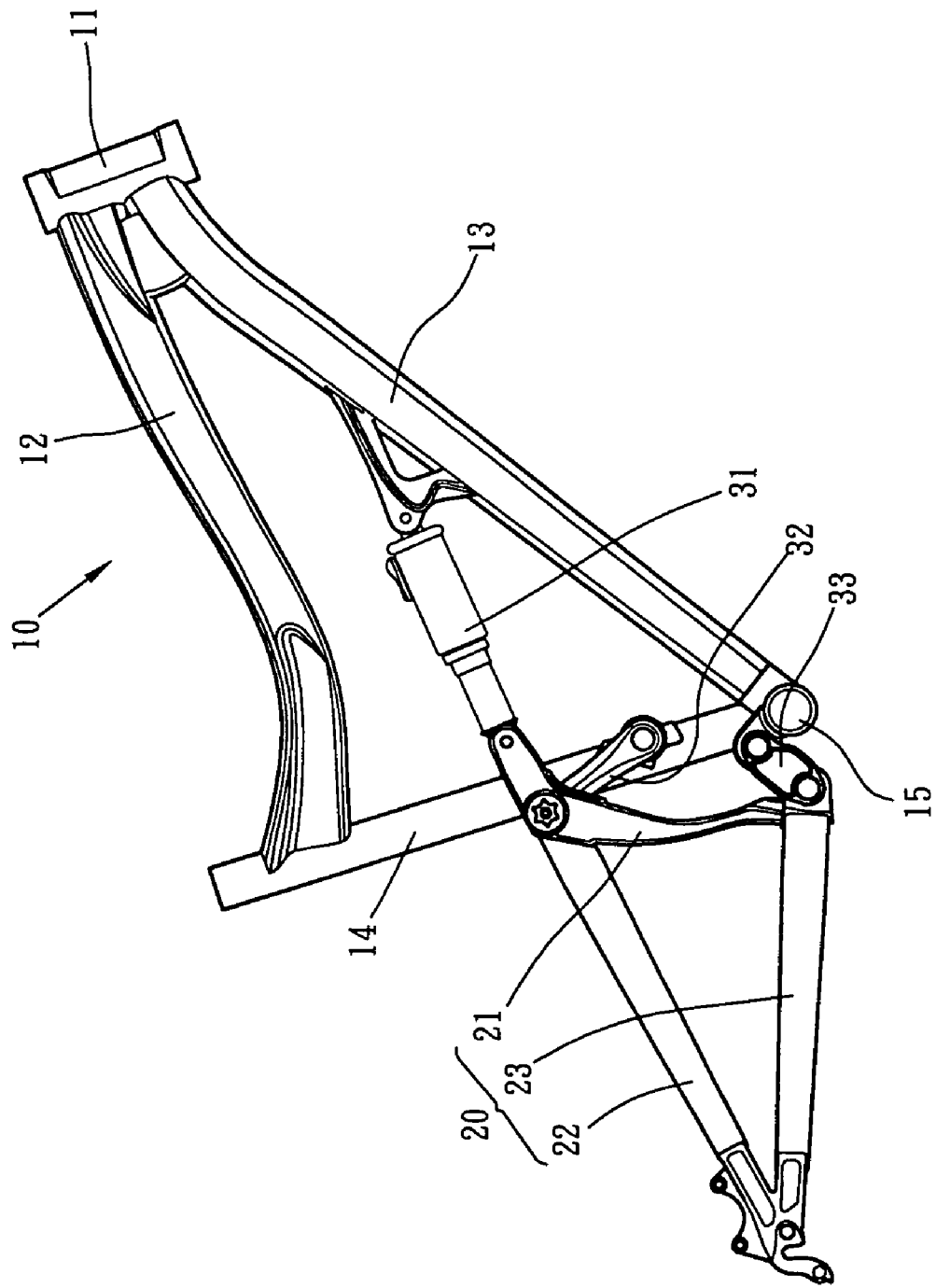
FIG. 1 is a profile view of the present invention to illustrate the components of the front triangle.
Figure 2:
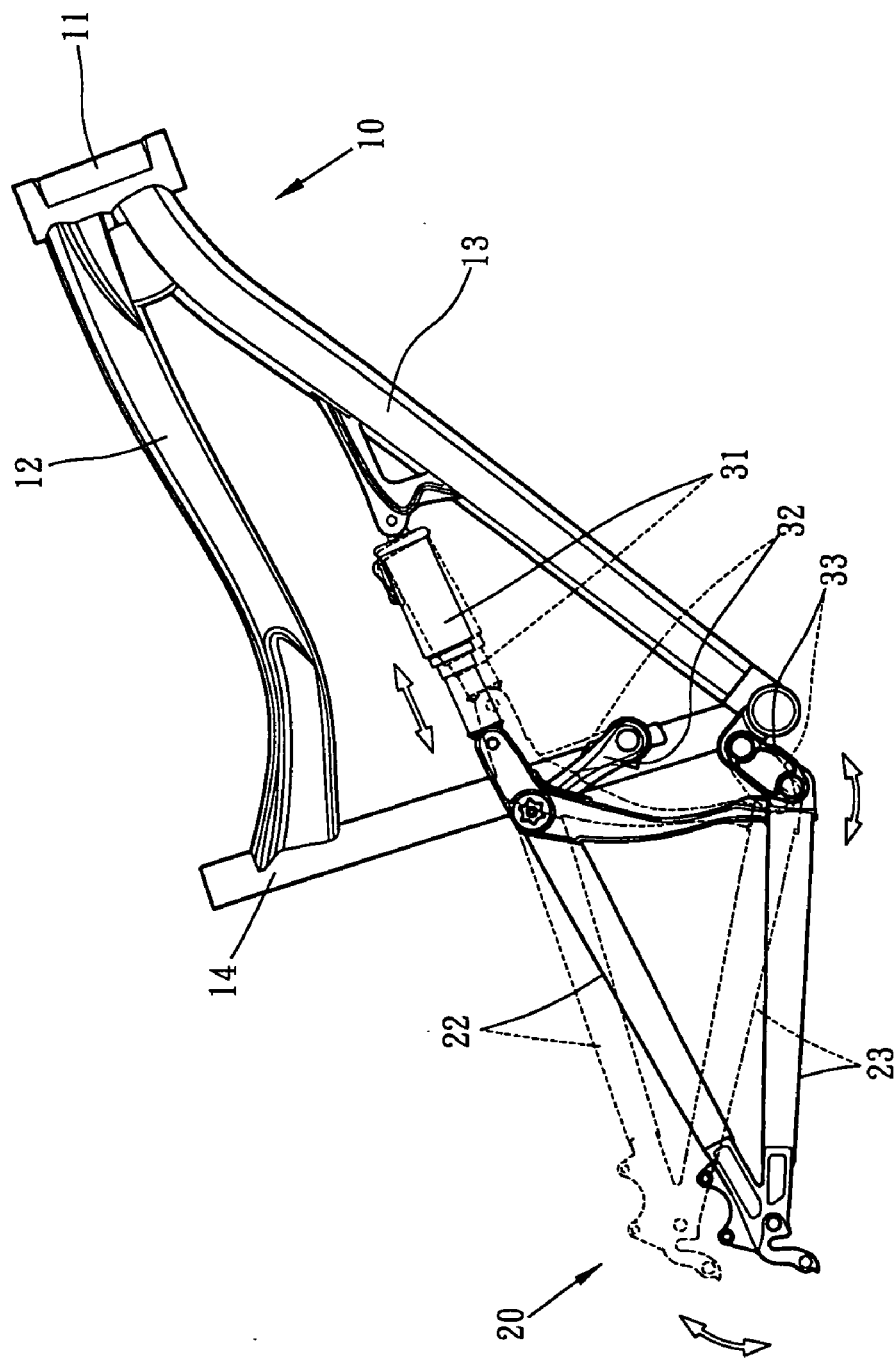
FIG. 2 is a profile view of the present invention to illustrate the components of the rear triangle and linkage members.

FIG. 1 and FIG. 2 depicts a preferred embodiment of a rear wheel suspension system of a bicycle of the present invention. The bicycle main frame 10 generally includes a seat tube 14 and a down tube 13 both of which are attached to a bottom bracket 15 that houses a pedal assembly, a top tube 12, together with the down tube 13 attached to the head tube 11, and a front fork (not shown). There is a first location above the bottom bracket pivot axis and proximate the bicycle chain drive force line for the pivotal connection to the first linkage member 33 of the rear wheel suspension system, and a second location above the first location for the pivotal connection to the second linkage member 32. Additionally, there is a connection on the down tube 13 for the forward connection of the shock absorber 31. These elements are typically welded or otherwise secured together to define the main frame 10 of the bicycle. Although the main frame 10 typically includes all of the foregoing members, alternative embodiments can have more or less than all of the foregoing members, and can include them in various forms, sizes, and configurations, and still achieve the intended functionality and beneficial aspects of the invention.

The rear wheel suspension system generally includes a first linkage member 33, a rear wheel swingarm 20, and a second linkage member 32. The first linkage member 33 of the preferred embodiment is a link in which the distance between the pivotal connections between the first linkage member 33 and the main frame 10 and the first linkage member 33 and the rear triangle is approximately 58 mm. The pivotal connections are typically achieved through the use of bearings. The pivotal connection between the first linkage member 33 and the front triangle is located 30.5 mm behind the main frame pedal axis and 26 mm above the main frame pedal axis. It should be clear to one skilled in the art that a pivotal connection other than a bearing could be utilized for either pivotal connection, the pivotal connection to the rear triangle could be contained within either the first linkage member 33 or the rear triangle, and the distance between the pivotal connections of the first linkage member 33 as well as the main pivots location relative to the bottom bracket 15 could be adjusted to accommodate various configurations without changing the scope of the present invention.

The rear wheel swingarm 20 includes a pair of seat stays 22 and a pair of chain stays 23 that are joined to each other at their rearward ends proximate the axle of the rear wheel at a pair of rear wheel dropouts. An upright structure 21 is engaged between the chain stays 23 and the seat stays 22 to provide a rigid triangular structure for the swingarm 20. A chain stay yoke is joined to the forward end of the chain stays 23, and houses a pivotal connection to the first linkage member 33. Seat stay ends are joined to the forward end of the seat stays 22 and house a pivotal connection to the second linkage member 32 as well as a rearward connection to the shock absorber 31. The rearward connection to the shock absorber 31 is located approximately 65.4 mm from of the pivotal connection between the second linkage member 32 and the rear triangle. The distance between the chain stay pivot and the rear axle of the preferred embodiment is approximately 376 mm, and said length can be accomplished by various combinations of lengths of dropout, chain stay, and chain stay yoke. The distance between the seat stay pivotal connection between the rear triangle and the second linkage member and the rear wheel axle of the preferred embodiment is approximately 405 mm. The distance between the pivotal connections between the rear triangle and the first and second linkage members of the preferred embodiment is approximately 211 mm. It should be clear to one skilled in the art that a pivotal connection other than a bearing could be utilized for either pivotal connection, and that lengths of various members could be adjusted to accommodate various configurations without changing the scope of the present invention.

The second linkage member 32 has a pivotal connection to the rear triangle at one end, and a pivotal connection to the main frame 10 on the other end. The distance between the two pivotal connections of the preferred embodiment is approximately 98 mm. The pivotal connection between the second linkage member 32 and the main frame of the bicycle is located approximately 119.5 mm above the bottom bracket 15 and 17.7 mm behind the bottom bracket 15.

A shock absorber 31 is pivotally engaged between the forward shock mount of the main frame 10 and the rearward shock mount of the rear triangle seat stay ends. As the rear wheel is articulated generally upwards along its axle path, the shock absorber 31 is compressed in length between the two mounting points providing resistance to the rear wheel's motion.

In addition to the above described members of the preferred embodiment, additional conventional elements such as those used to secure cables, brakes, drivetrain components and the like to the frame and keep them away from interfering with the movement and operation of the bicycle may also be attached at various locations. Persons of ordinary skill in the art will appreciate that the exact configuration and relationship between the seat stays 22, chain stays 23, upright members 21 and attachment points with frame members can vary depending on, among other things, the size of the bicycle frame, and the size of the rear wheel. While a preferred embodiment in accordance with the present invention has been described and shown, it should be clear to those skilled in the art that further embodiments may be made without departing from the scope of the present invention.

Figure 3:
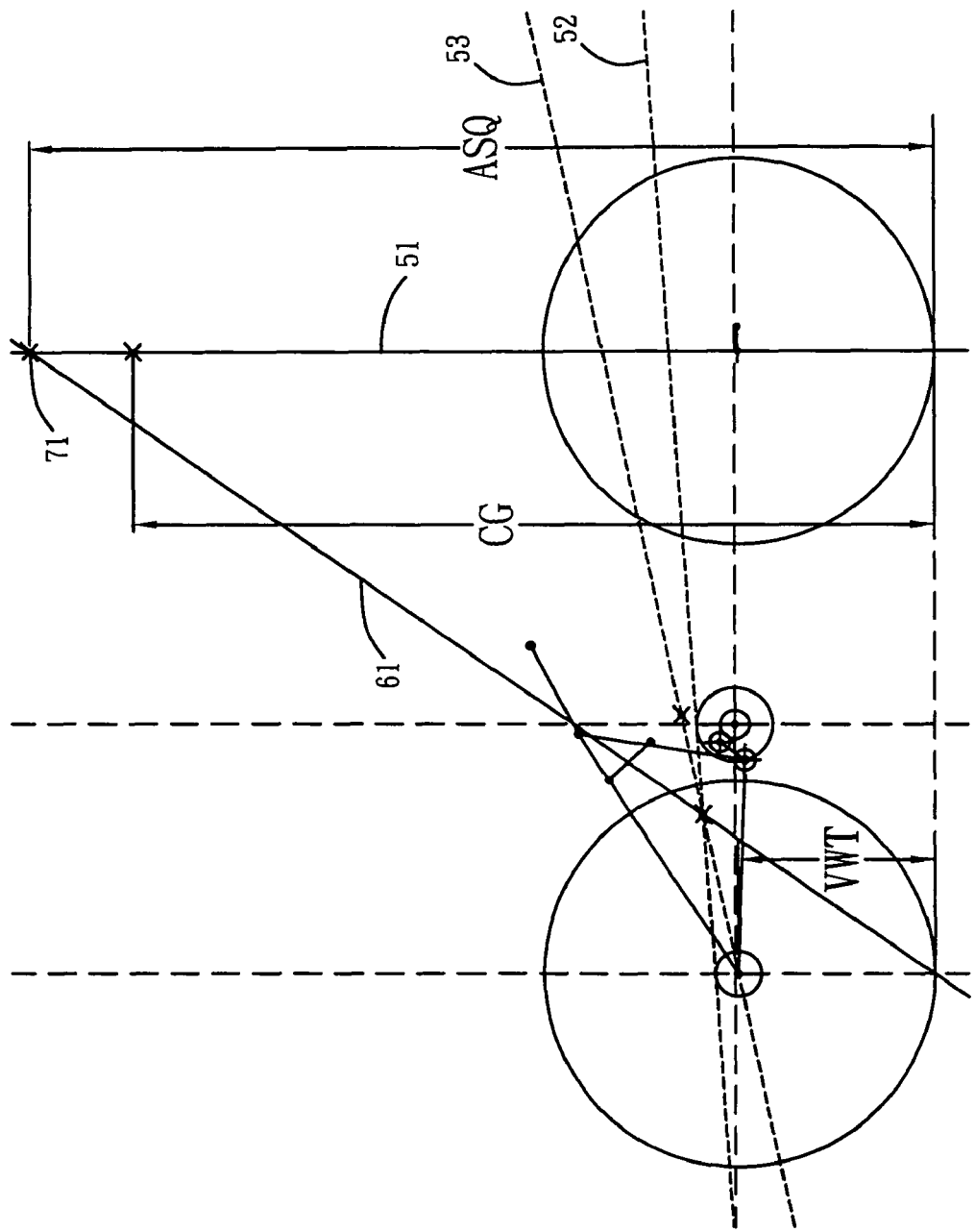
FIG. 3 is a side view shown the details for Anti-squat acceleration measurement.
Figure 4:
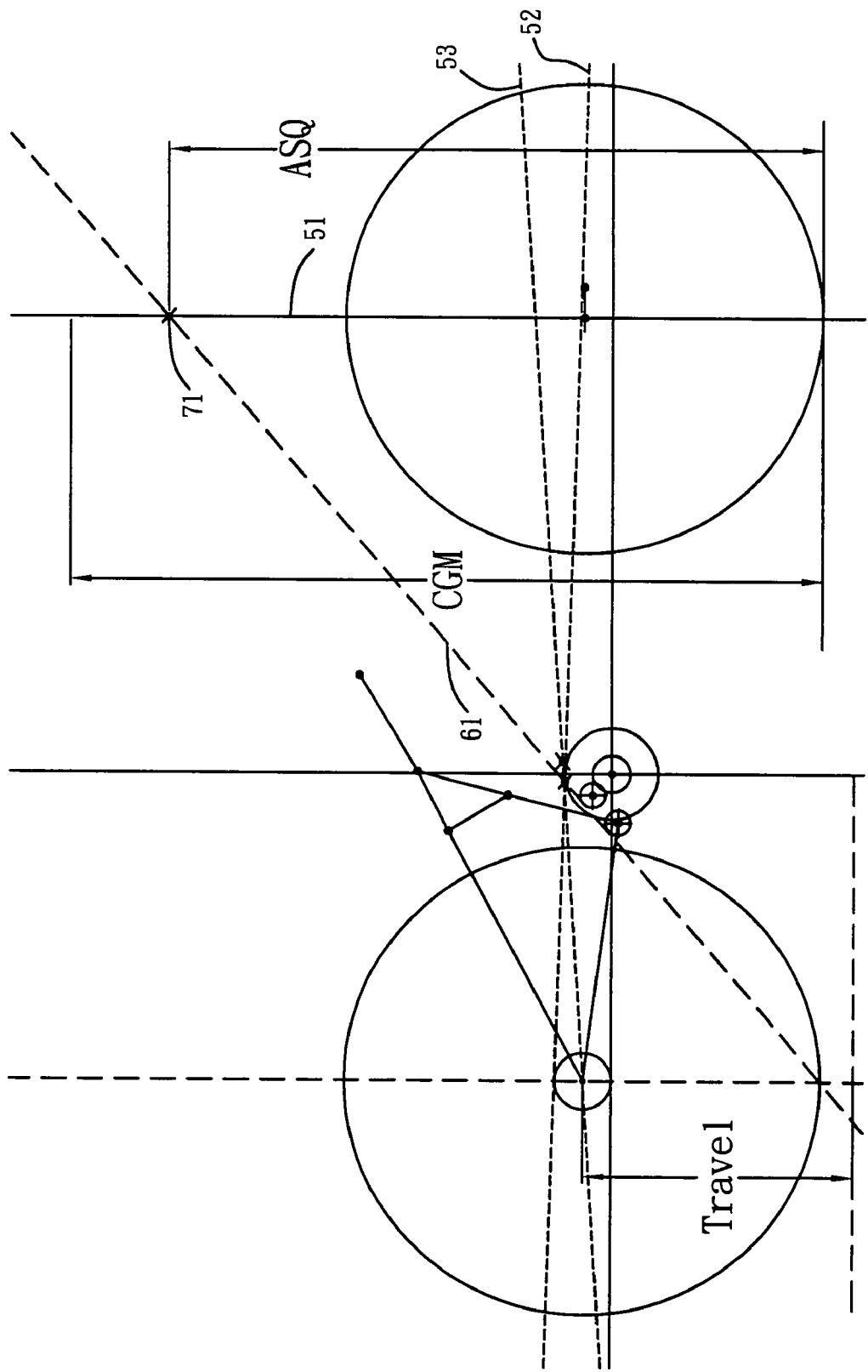
FIG. 4 is a side view shown Anti-squat acceleration measurement when bottom closer to the ground.

Referring to FIGS. 3 to 4, line 51 is drawn vertical through the front wheel, line 52 is drawn tangent to the rear chain gear and tangent to the front chainwheel, line 53 is drawn center of the rear wheel to the instant center (location that the CL of the links intersects), line 61 is drawn from the contact patch of the rear wheel to the intersection point of the line 52 and line 53, this line extends to hit line 51, at the point it hits line 51 to the ground (vertical distance) is the point that is the anti squat point 71. Center of gravity in the Y location is shown in the FIG. 3 and FIG. 4. The percent of Anti Squat acceleration is shown on the FIG. 3 and FIG. 4 but is the following equation: (Anti squat #−Center of Gravity #)/(Center of gravity #)+1.

Figure 5:
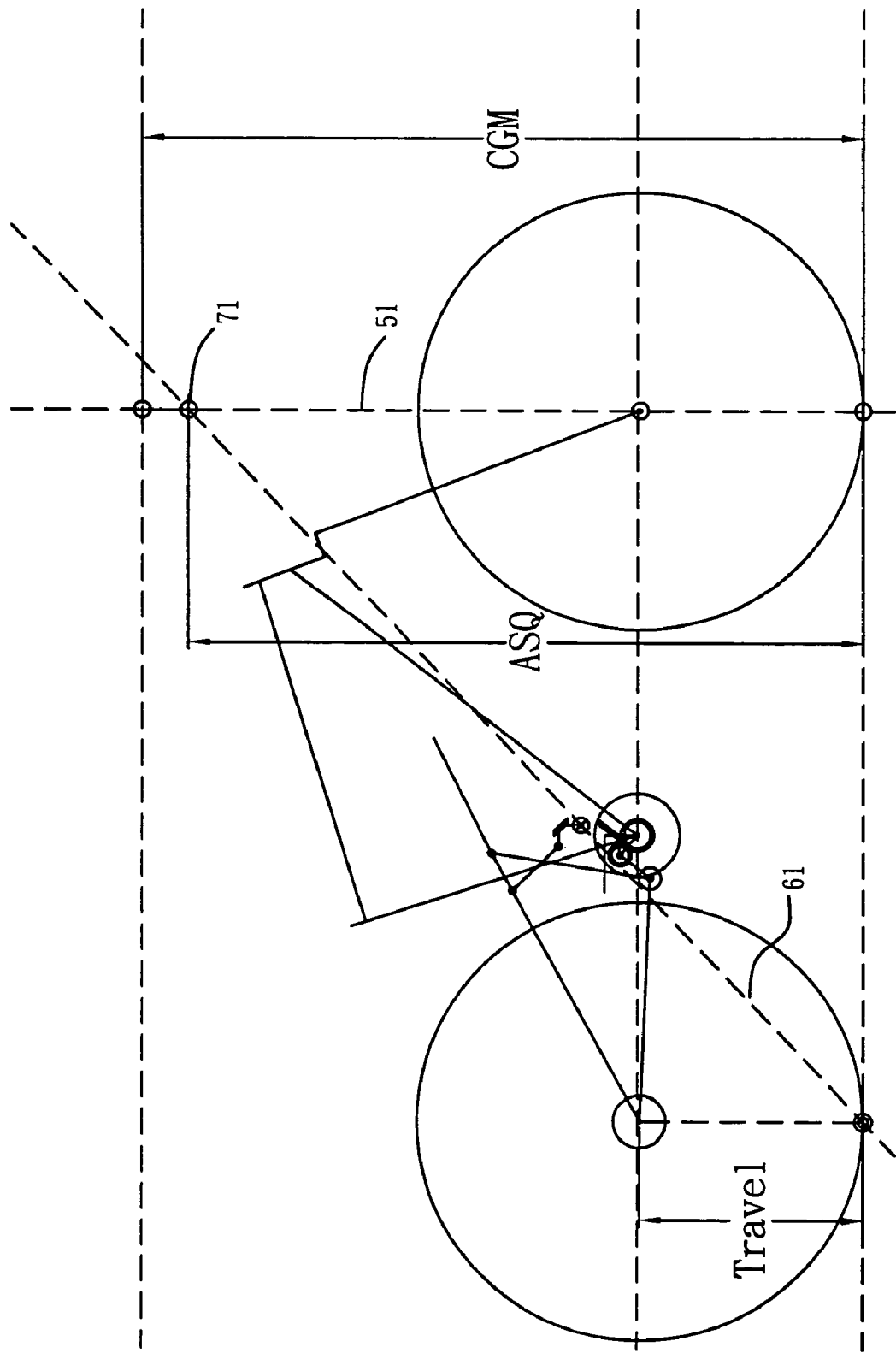
FIG. 5 is a side view shown Braking Anti Squat Percentage of the present invention.
Figure 6:
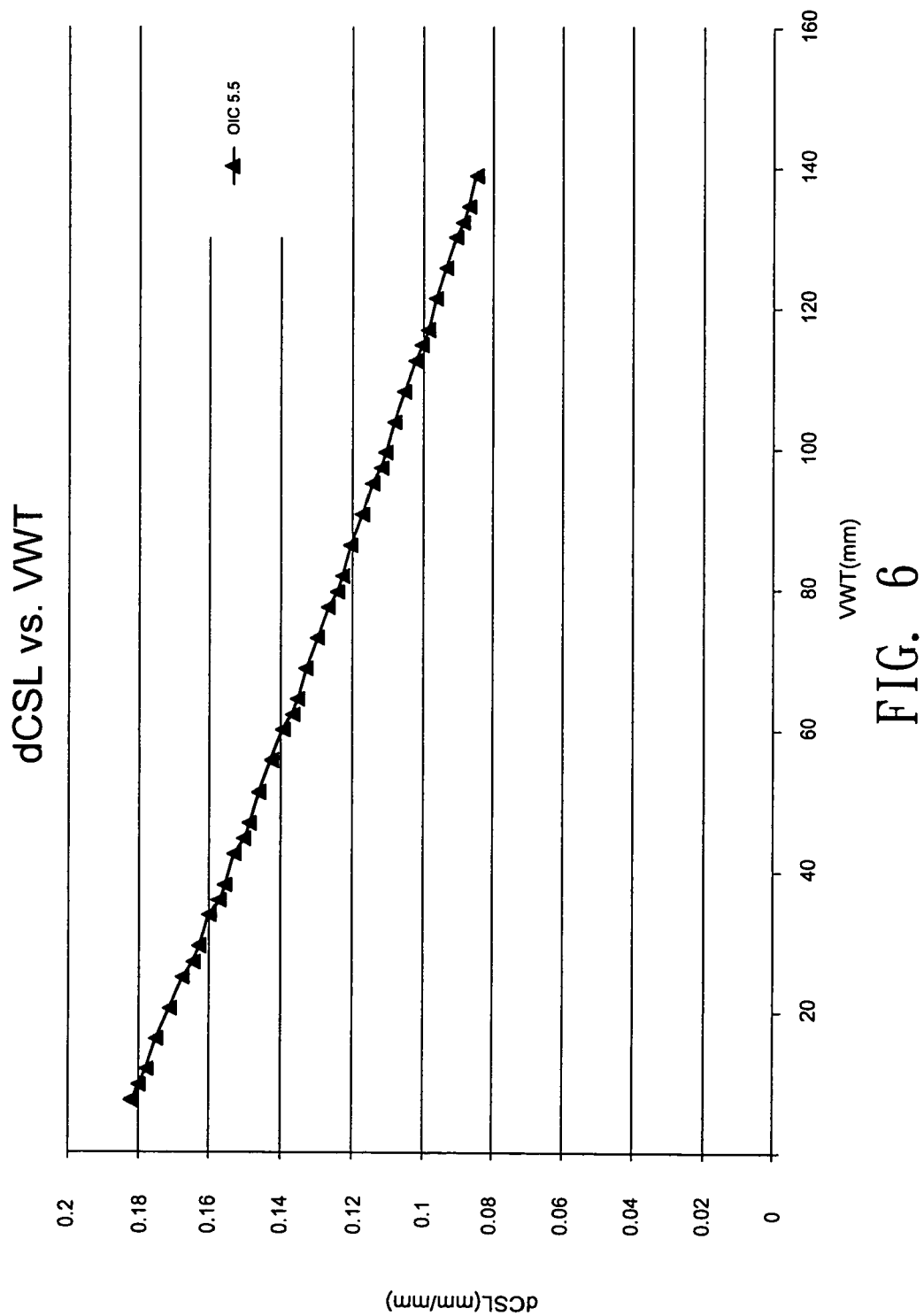
FIG. 6 is a graph of the derivative of chain stay length (dCSL) vs. vertical wheel travel (VWT) for the present invention.
Figure 7:
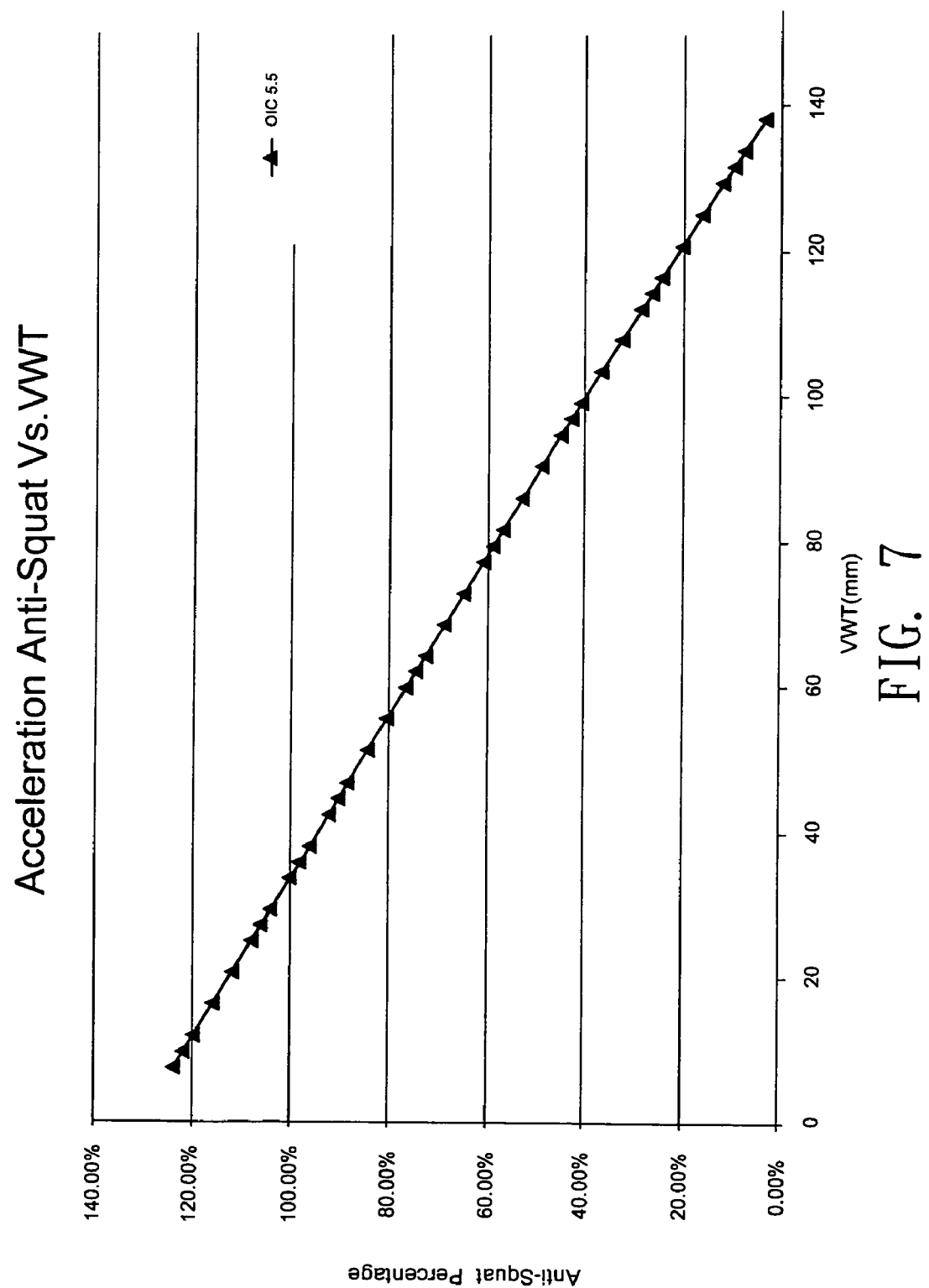
FIG. 7 is a graph of the acceleration anti-squat percentage vs. vertical wheel travel for the present invention.
Figure 8:
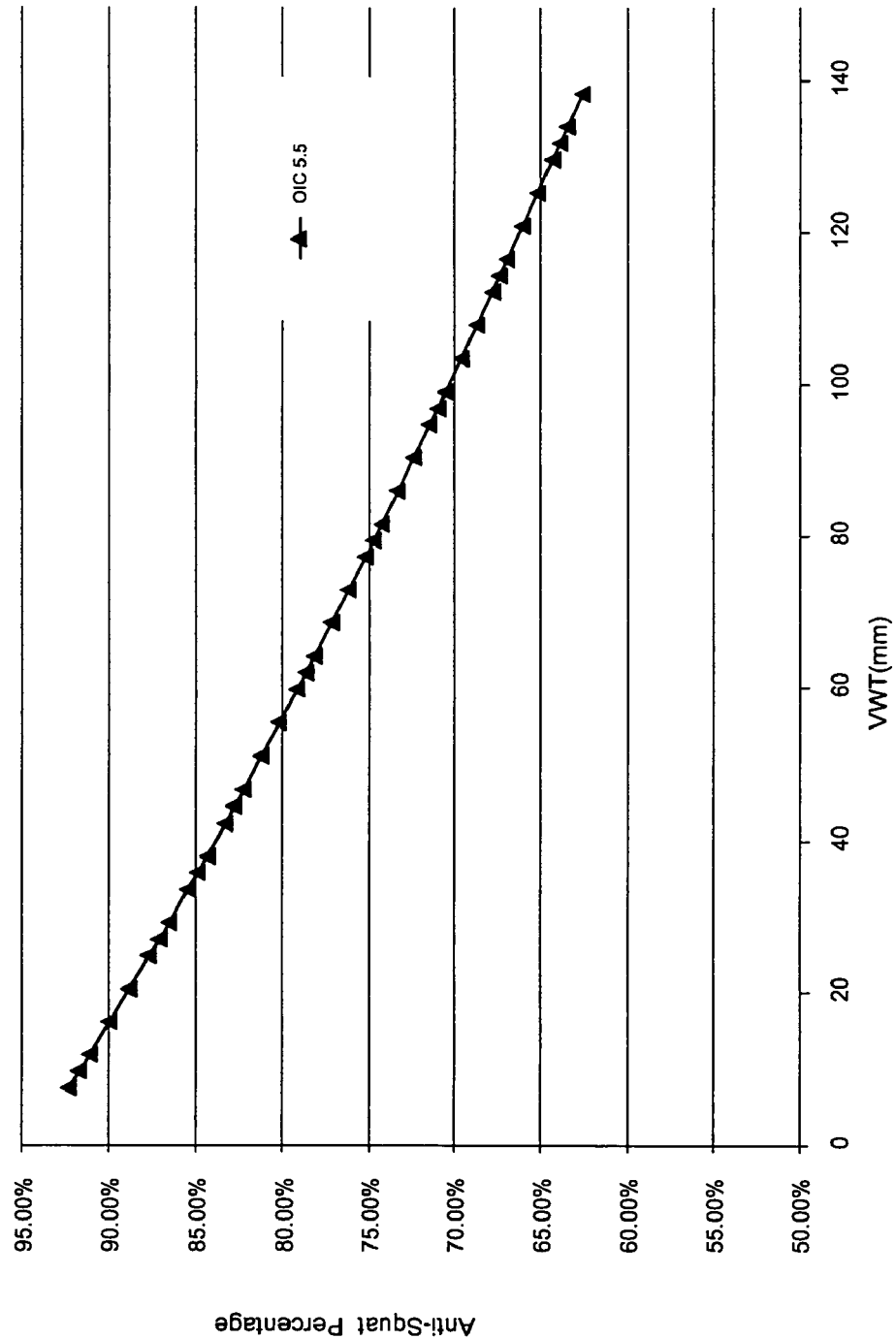
FIG. 8 is a graph of the braking anti-squat percentage vs. vertical wheel travel for the present invention.

Referring to FIG. 5, the percent Anti Squat braking can be calculated by: (Anti squat braking#−Center of Gravity)/(Center of gravity)+1.

The frame center of gravity is determined from the individual parts center of gravity, The rider COG was initially determined from "A Multibody Model for the Simulation of Bicycle Suspension Systems". Waechter, Riess. and Zacharias in the Journal of Vehicle System Dynamics, 2002, Vol. 37, No. 1, pp 3-28.

What is claimed is:

1. A bicycle comprised of a front triangle and a rear wheel suspension system, the rear wheel suspension system including a rear wheel swingarm, a first linkage member coupled to the rear wheel swingarm at a first pivotal connection and coupled to the front triangle at a second pivotal connection, and a second linkage member coupled to the rear wheel swingarm at a third pivotal connection and coupled to the front triangle at a fourth pivotal connection;

wherein the first linkage member defines a distance of approximately 58 millimeters between the first and second pivotal connections;

wherein the second linkage member defines a distance of approximately 98 millimeters between the third and fourth pivotal connections;

wherein the second pivotal connection is disposed approximately 30.5 millimeters behind and approximately 26 millimeters above a pedal axis of the bicycle when the bicycle is in an upright horizontal orientation;

wherein the fourth pivotal connection is disposed approximately 17.7 millimeters behind and approximately 119.5 millimeters above the pedal axis when the bicycle is in an upright horizontal orientation; and in which the rear suspension system is configured such that a rate of chainstay lengthening decreases in a linear manner with respect to increasing vertical movement of a rear wheel of the bicycle and an anti-squat response under acceleration and braking decreases in a linear manner with respect to increasing vertical movement of the rear wheel.

2. The suspension system of claim 1 where an instant center created by an intersection of force lines through the first and second linkage members moves in a generally downward and rearward motion as the suspension system is compressed and is forward of the second pivotal connection when the suspension system is fully compressed.

3. The suspension system of claim 2 where a value of 100% Anti-Squat under acceleration occurs at a statically loaded sag point where approximately 25% of vertical wheel travel is utilized.

4. The suspension system of claim 3 where the first pivotal connection and the third pivotal connection are both disposed rearward of the pedal axis when the bicycle is in an upright horizontal orientation.

5. A bicycle comprised of a front triangle and a rear wheel suspension system, the rear wheel suspension system including a rear wheel swingarm, a first linkage member coupled to the rear wheel swingarm at a first pivotal connection and coupled to the front triangle at a second pivotal connection, and a second linkage member coupled to the rear wheel swingarm at a third pivotal connection and coupled to the front triangle at a fourth pivotal connection;

wherein the first linkage member defines a first distance between the first and second pivotal connections;

wherein the second linkage member defines a second distance between the third and fourth pivotal connections which is less than twice the first distance;

wherein the second pivotal connection is disposed behind and above a pedal axis of the bicycle when the bicycle is in an upright horizontal orientation;

wherein the fourth pivotal connection is disposed behind and above the pedal axis when the bicycle is in an upright horizontal orientation; and in which the rear suspension system is configured such that a rate of chainstay lengthening decreases in a linear manner with respect to increasing vertical movement of a rear wheel of the bicycle and an anti-squat response under acceleration and braking decreases in a linear manner with respect to increasing vertical movement of the rear wheel.

6. The suspension system of claim 5 where an instant center created by an intersection of force lines through the first and second linkage members moves in a generally downward and rearward motion as the suspension system is compressed and is forward of the second pivotal connection when the suspension system is fully compressed.

7. The suspension system of claim 6 where a value of 100% Anti-Squat under acceleration occurs at a statically loaded sag point where approximately 25% of vertical wheel travel is utilized.

8. The suspension system of claim 7 where the first pivotal connection and the third pivotal connection are both disposed rearward of the pedal axis when the bicycle is in an upright horizontal orientation.

9. A bicycle comprised of a front triangle and a rear wheel suspension system, the rear wheel suspension system including a rear wheel swingarm, a first linkage member coupled to the rear wheel swingarm at a first pivotal connection and coupled to the front triangle at a second pivotal connection, and a second linkage member coupled to the rear wheel swingarm at a third pivotal connection and coupled to the front triangle at a fourth pivotal connection;

wherein the second pivotal connection is disposed behind and above a pedal axis of the bicycle when the bicycle is in an upright horizontal orientation;

wherein the fourth pivotal connection is disposed behind and above the pedal axis when the bicycle is in an upright horizontal orientation;

wherein the first pivotal connection is separated from the third pivotal connection by a distance approximately two times the distance between the third and fourth pivotal connections; and in which the rear suspension system is configured such that a rate of chainstay lengthening decreases in a linear manner with respect to increasing vertical movement of a rear wheel of the bicycle and an anti-squat response under acceleration and braking decreases in a linear manner with respect to increasing vertical movement of the rear wheel.

10. The suspension system of claim 9 where an instant center created by an intersection of force lines through the first and second linkage members moves in a generally downward and rearward motion as the suspension system is compressed and is forward of the second pivotal connection when the suspension system is fully compressed.

11. The suspension system of claim 10 where a value of 100% Anti-Squat under acceleration occurs at a statically loaded sag point where approximately 25% of vertical wheel travel is utilized.

12. The suspension system of claim 11 where the first pivotal connection and the third pivotal connection are both disposed rearward of the pedal axis when the bicycle is in an upright horizontal orientation.

* * * * *